(12) United States Patent
Bergsten

(10) Patent No.: US 7,046,156 B2
(45) Date of Patent: May 16, 2006

(54) ALARM SYSTEM FOR A MOTOR VEHICLE

(75) Inventor: Fredrik Bergsten, Nykvarn (SE)

(73) Assignee: SCANIA CV AB (publ), (SE)

( * ) Notice: Subject to any disclaimer, the term of this patent is extended or adjusted under 35 U.S.C. 154(b) by 496 days.

(21) Appl. No.: 10/169,298

(22) PCT Filed: Dec. 19, 2000

(86) PCT No.: PCT/SE00/02576

§ 371 (c)(1),
(2), (4) Date: Jun. 27, 2002

(87) PCT Pub. No.: WO01/49536

PCT Pub. Date: Jul. 12, 2001

(65) Prior Publication Data

US 2003/0058123 A1    Mar. 27, 2003

(30) Foreign Application Priority Data

Dec. 30, 1999    (SE) ..................... 9904853

(51) Int. Cl.
*G08B 21/00*    (2006.01)
(52) U.S. Cl. .............. 340/636.1; 340/455; 320/104
(58) Field of Classification Search ........... 340/636.1, 340/455, 693.2, 636.18, 661, 662; 307/130, 307/66; 320/21, 48, 104, 136
See application file for complete search history.

(56) References Cited

U.S. PATENT DOCUMENTS

| | | | | |
|---|---|---|---|---|
| 4,761,631 A | * | 8/1988 | Hwang | 340/455 |
| 4,929,931 A | * | 5/1990 | McCuen | 340/636.15 |
| 5,039,927 A | | 8/1991 | Centafanti | 320/2 |
| 5,549,984 A | * | 8/1996 | Dougherty | 429/61 |
| 5,563,576 A | | 10/1996 | Drori et al. | 340/455 |
| 6,404,081 B1 | * | 6/2002 | Staffiere | 307/130 |

FOREIGN PATENT DOCUMENTS

| | | |
|---|---|---|
| EP | 0780820 | 6/1997 |
| GB | 2170633 | 8/1986 |
| WO | 9516248 | 6/1995 |

\* cited by examiner

*Primary Examiner*—Phung T. Nguyen
(74) *Attorney, Agent, or Firm*—Ostrolenk Faber Gerb & Soffen, LLP

(57) ABSTRACT

Alarm system for motor vehicle, incorporating an alarm control unit which is powered by a main battery of the motor vehicle, a siren unit likewise powered by the main battery, and a back-up battery in the siren unit which is arranged to power the siren unit upon failure of the power supply from the main battery. To simplify and make such an alarm safer, it is proposed inter alia that upon said failure of power supply from the main battery the back-up battery be arranged to automatically power also the alarm control unit.

7 Claims, 1 Drawing Sheet

ALARM SYSTEM FOR A MOTOR VEHICLE

TECHNICAL FIELD

The invention relates to an alarm system for a motor vehicle, incorporating an alarm control unit which is powered by a main battery of the motor vehicle, a siren unit likewise powered by the main battery, and a back-up battery in the siren unit, which is arranged to power the siren unit upon failure of the power supply from the main battery.

STATE OF THE ART

Alarm systems which incorporate not only the back-up battery in the siren unit but also a back-up battery for the alarm control unit are known.

Also known according to GB-A-2300745 is an alarm system which has not only the actual alarm function but also a so-called immobiliser function and in which the alarm control unit is connected to an engine control unit via the siren unit's back-up battery. In normal operation the alarm and other components receive power from the main battery. When the engine is being started, power is received from the back-up battery in order to send information from the alarm control unit to the engine control unit. If the siren unit and its battery are out of action, the engine cannot start. In the event of voltage failure, a key has to be turned in a lock to connect the back-up battery to other parts of the alarm and the immobiliser. This known system may, in other words, be regarded as protecting the siren of the alarm function and providing short-term power supply to various control units to enable resetting of the system, but does not guarantee that the function is maintained.

SUMMARY OF THE INVENTION

One object of the present invention is to simplify known alarm systems so as to improve alarm function when using only one back-up battery, so that in the event of voltage failure the primary functions of the alarm system can operate long enough for the alarm to be able to function in the desired manner.

This is achieved by the invention. An alarm system for a motor vehicle has an alarm control unit powered by the main vehicle battery. A siren is powered by the main battery and also by a back up battery at the siren which powers the battery siren upon failure of power supply from the main battery. The siren is in a unit that senses power offtake from the back up battery and reacts if the offtake exceeds a level, e.g. due to a change in the operational state of the alarm control unit. Upon failure of the main battery, the back-up battery also powers the alarm control unit.

According to one version of the invention, the back-up battery is arranged to also supply the alarm control unit with power automatically upon failure of the power supply from the main battery. No further auxiliary means are needed for achieving this (cf. GB 2300745). The invention therefore describes a system which maintains normal function continuously if the main power supply fails. The back-up battery can power the alarm control unit and hence maintain normal function in the system 24 hours a day for approximately three days.

The system is simplified in that the alarm control unit has no need of its own back-up battery and associated supervisory electronics. The single back-up battery may therefore be allowed a larger capacity so that a tripped alarm can operate for a prolonged period by means of the back-up battery alone, e.g. for eight cycles of 30 seconds each. In addition, the system can be rendered safer against interference, since the number of components and hence the number of possible points for such interference are reduced.

The siren unit thus maintains power as necessary automatically for the alarm control unit while the siren unit and the alarm control unit are continuously communicating with one another. The alarm control unit is arranged to communicate an operating state of the alarm system continuously to the siren unit, and the siren unit communicates its status to the alarm control unit. If the operating state deviates from a predetermined operating state of the alarm control unit, the siren unit is arranged to deliver an alarm. In addition to the state of the alarm system's sensors, this operating state relates to the power consumption of the alarm control unit.

According to a preferred embodiment, the siren unit is also used to detect power offtake from the back-up battery and communicates simultaneously with the alarm control unit. This enables power offtake to be recorded by the electronics of the alarm system so that the siren unit provides the control unit with the possibility of delivering an alarm if the power offtake exceeds a specified level, e.g. in the event of unauthorised attempt to discharge the back-up battery by means of a power-consuming circuit. It also makes it possible to investigate whether the alarm is actually consuming power and to limit power offtake.

According to another embodiment of the invention, the siren unit is provided with a heating device arranged to deliver heat to the back-up battery below a predetermined ambient temperature, so that the capacity of the back-up battery can be substantially improved in cold weather. Advantageously the back-up battery should be able to operate 24 hours a day for about three days at an ambient temperature of down to at least −20° C. The heating device makes it possible for the battery to operate even below that temperature, but the period for which it can operate at full capacity may then be somewhat shorter. The total service life of a back-up battery is about five years.

Other features and advantages of the invention are indicated by the following detailed description.

DESCRIPTION OF PREFERRED EMBODIMENT

Figure 1:
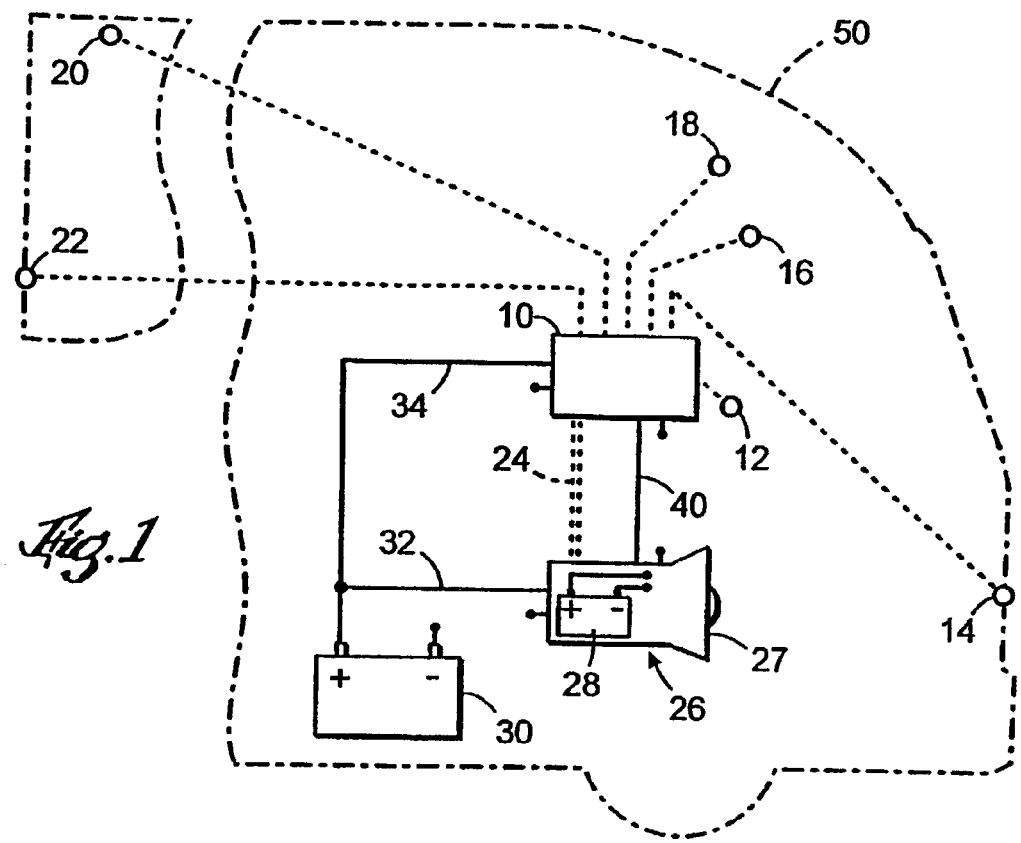
FIG. 1 depicts a circuit diagram of a preferred embodiment of the invention.

The schematic depiction in FIG. 1 suggests the alarm system incorporated in a motor vehicle 50 such as a truck or a bus. The invention may nevertheless be applied to all types of motor vehicles.

Reference 10 denotes an electronic alarm control unit of a type known per se. The alarm control unit 10 is in signal connection, i.e. cable connection with a number of sensors 12, 14, 16, 18, 20 and 22. The sensors are arranged to detect mechanical and other interference with the vehicle. Such influences may include not only unauthorised opening, e.g. via end-position sensors, of the bonnet, passenger doors, load space doors and roof hatch but also unauthorised presence, via presence sensors, in the passenger compartment or the load space.

The alarm control unit 10 includes an electronic circuit 36 (FIG. 2) incorporating a microprocessor 38 which processes the signals from the sensors and passes them on in signal packets described below to a separate siren unit 26 with a siren 27 via a serial two-wire communication cable 24. The siren unit 26 likewise houses an electronic circuit 42 with a microprocessor 48.

The electronic circuits 36 and 42 continuously communicate coded digital signal packets to one another via the communication cable 24. The signal packets are analysed by the microprocessor 48 and compared with reference signal packets stored in a memory. If the communicated signal packets deviate (e.g. if a sensor delivers signals when the alarm signal is activated) from the reference signal packets or are completely absent (e.g. due to interruption described below in the power supply in the alarm control unit 10), the microprocessor 48 initiates tripping of the alarm system so that the siren 27 delivers an acoustic alarm.

A main battery 30 in the vehicle 50 normally powers the siren unit 26 via a battery cable 32. The siren unit 26 also has in a conventional manner its own back-up battery 28. The back-up battery 28 is preferably encased in a surrounding housing in the siren unit 26 so that its battery cables are not exposed to interference. The back-up battery 28 is charged by the main battery 30 under the control of the electronic circuit 42 in the siren unit 26. In the event of interference with the main battery 30 or the battery cable 32, resulting in cessation of power supply from the main battery 30 to the siren unit 26, the electronic circuit 42 connects the back-up battery 28 to the siren unit 26 so that the siren 27 delivers an alarm.

According to the invention, the back-up battery 28 also powers the alarm control unit 10 via a cable 40. Such a back-up battery usually has a capacity of 0.3–0.6 Ah. To be able to drive both units and the alarm the desired number of times over the desired period, the back-up battery 28 advantageously has according to the invention a larger capacity of about 1.2–2.0 Ah. The extra cost of this is more than compensated by the fact that only one back-up battery need be maintained with the simplified design according to the invention.

In the event of interference with the main battery 30 or its normal power supply to the alarm control unit 10 via a battery cable 34, resulting in interruption of the power supply from the main battery 30 to the alarm control unit 10, the siren 27 is likewise arranged to deliver an alarm. This involves the electronic circuits 36 and 42 collaborating via the communication cable 24 so that the back-up battery 28 drives both the siren unit 26 and the alarm control unit 10. Although not depicted, it is also possible during normal power supply to have the main battery 30 drive the alarm control unit 10 via the cables 32 and 40, making it possible to dispense with the cable 34.

In addition to the alarm functions described above, the siren unit 26 is also arranged to give an alarm if power offtake from the back-up battery 28 exceeds a predetermined level. Such power offtake may be caused by an unauthorised attempt to put the alarm out of action by using an extraneous power consumer 60 to discharge the back-up battery 28 from the cable 40. In the preferred embodiment, the electronic circuit 42 incorporates a low-resistance (e.g. 1 ohm) shunt resistance 44 connected in the line 40, and an A/D converter 46 connected in parallel via the resistance. If the current in the line 40 exceeds the predetermined level, the A/D converter 46 detects a corresponding voltage drop, which is signalled to the microprocessor 48, which trips the alarm and stops the power to the cable 40.

Figure 2:
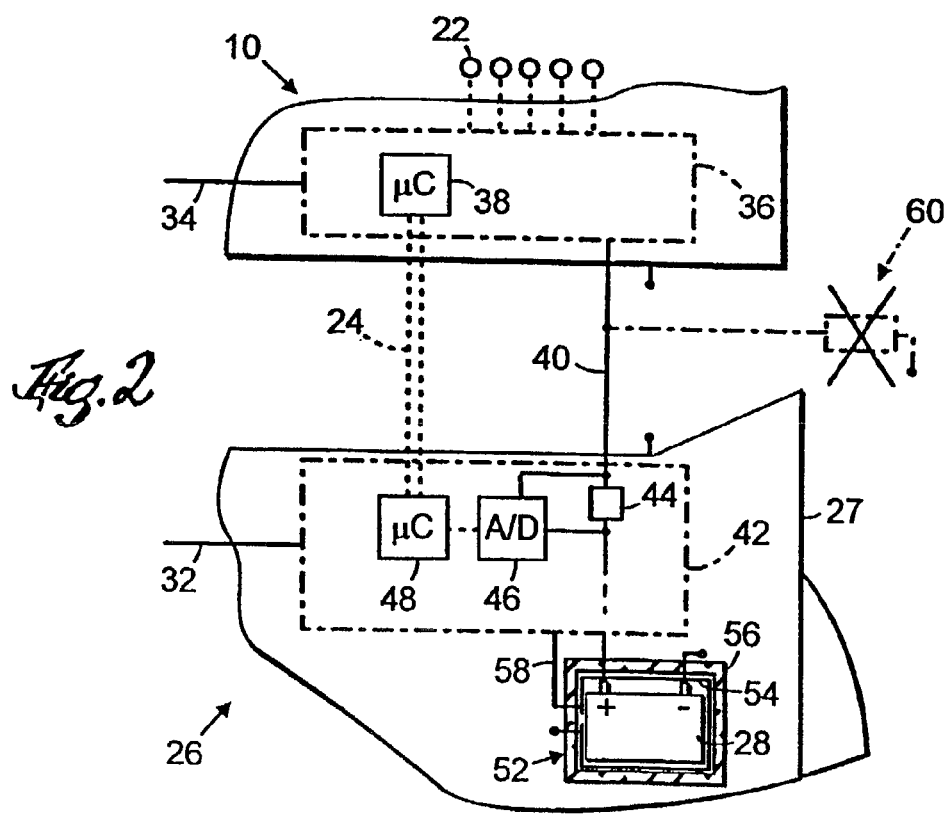
FIG. 2 depicts on a larger scale and in more detail parts of an alarm control unit and a siren unit as per the circuit diagram in FIG. 1.

As indicated in FIG. 2, the back-up battery 28 may be provided with a heating device 52. In the preferred embodiment, the heating device 52 incorporates an electric heating coil 54 which extends in the inside of a thermally insulated housing 56 for the back-up battery 28. The heating coil 54 and any thermal insulation may alternatively extend in the inside of the actual siren unit 26 (not depicted). The heating coil 54 is powered via a cable 58 fed by the main battery 30 in the motor vehicle 50. When the alarm is activated, the power supply to an undepicted temperature sensor connected to the electronic circuit 42 ceases, so the heating coil 54 comes into operation at a predetermined minimum temperature of the surroundings, e.g. 0° C.

The invention claimed is:

1. Alarm system for a motor vehicle, comprising
an alarm control unit connected to and powered by a main battery of the motor vehicle;
a siren unit connected to and powered by the main battery,
a back-up battery connected to and operable to power both the alarm control unit and the siren unit upon failure of the power supply from the main battery,
the siren unit being adapted to detect a power offtake from the back-up battery and the siren unit being operable to deliver an alarm if the detected power offtake exceeds a predetermined level.

2. Alarm system according to claim 1, wherein the alarm control unit is arranged to communicate a power consumption state of the alarm system continuously to the siren unit, and the siren unit is operable to deliver an alarm if the power offtake from the back-up battery deviates from a predetermined operating state of the alarm control unit.

3. Alarm system according to claim 1, wherein the siren unit is also arranged to stop power offtake if the offtake exceeds a predetermined level.

4. Alarm system according to claim 1, further comprising a heating device arranged to deliver heat to the back-up battery at a predetermined ambient temperature.

5. Alarm system according to claim 1, wherein the siren unit is operable to communicate its status continuously to the alarm control unit.

6. Alarm system according to claim 1, wherein the back-up battery is adapted to power the alarm control unit continuously upon a power failure of the power supply from the main battery.

7. Alarm system according to claim 1, wherein the siren unit comprises a siren and the back-up battery is in the siren unit.

* * * * *